(12) United States Patent
Craswell et al.

(10) Patent No.: US 8,250,053 B2
(45) Date of Patent: Aug. 21, 2012

(54) INTELLIGENT ENHANCEMENT OF A SEARCH RESULT SNIPPET

(75) Inventors: Nicholas Eric Craswell, Cambridge (GB); Nitin Agrawal, Redmond, WA (US); Amir J. Padovitz, Redmond, WA (US); Song Zhou, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 434 days.

(21) Appl. No.: 12/392,015

(22) Filed: Feb. 24, 2009

(65) Prior Publication Data

US 2010/0228744 A1 Sep. 9, 2010

(51) Int. Cl.
G06F 7/00 (2006.01)
G06F 17/30 (2006.01)

(52) U.S. Cl. ........................................ 707/706
(58) Field of Classification Search .................. 707/706
See application file for complete search history.

(56) References Cited

U.S. PATENT DOCUMENTS

| | | | |
|---|---|---|---|
| 6,874,019 B2 | 3/2005 | Hamilton | |
| 7,392,238 B1 | 6/2008 | Zhou | |
| 7,440,947 B2 | 10/2008 | Adcock | |
| 2006/0156222 A1 | 7/2006 | Chi | |
| 2007/0250498 A1 | 10/2007 | Pedersen | |
| 2008/0071739 A1* | 3/2008 | Kumar et al. | 707/3 |
| 2008/0177717 A1 | 7/2008 | Kumar | |
| 2008/0201315 A1 | 8/2008 | Lazier | |
| 2011/0289068 A1* | 11/2011 | Teevan et al. | 707/709 |

OTHER PUBLICATIONS

Morris et al., Enhanced Collaborative Web Search with Personalization: Groupization, Smart Splitting, and Group Hit-Highlighting, CSCW'08, pp. 481-484, 2008, ACM.*
Kraft et al., "Mining Anchor text for Query Refinement", WWW2004, pp. 666-674, 2004, ACM.*
Behavioral Classification on the Click Graph http://research.microsoft.com/~szummer/papers/SzummerCraswell-behavioral-classification-www08.pdf.
Learning Query Intent from Regularized Click Graphs http://research.microsoft.com/users/xiaol/papers/sigir2008.pdf.

* cited by examiner

*Primary Examiner* — Michael Hicks
(74) *Attorney, Agent, or Firm* — Shook Hardy & Bacon LLP (57) ABSTRACT

A method, system, and medium are provided for enhancing a search result snippet that is associated with a URL. Potentially descriptive terms of the URL are identified by reconciling multiple sources of terms related to the URL. One aspect includes comparing search terms of historically relevant queries to anchor text for the URL. The search result snippet might be intelligently enhanced by causing common terms to be visibly distinguished when the snippet is displayed.

20 Claims, 7 Drawing Sheets

INTELLIGENT ENHANCEMENT OF A SEARCH RESULT SNIPPET

BACKGROUND

In response to a search query from a user, search result snippets are often displayed to the user. Each search result snippet is associated with a respective URL. A search result snippet is often designed to present a portion of content that satisfies the search query or otherwise assist the user in determining what content is provided by the URL.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

At a high level, this disclosure describes intelligently enhancing a search result snippet associated with a URL. A search result snippet is enhanced by visibly distinguishing terms included in the snippet that are determined to be potentially relevant to the URL. Our technology relates to identifying terms that might be relevant to the URL by reconciling multiple sources of terms relevant to the URL.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Our technology relates to intelligent enhancement of a search result snippet that is associated with a URL. In embodiments, our technology includes reconciling multiple sources of terms to identify common terms between the multiple sources. Examples of sources of terms include previously entered search queries and anchor text associated with the URL. To intelligently enhance the search result snippet, common terms are visibly distinguished, such as when the search result snippet is displayed to a user.

Figure 1:
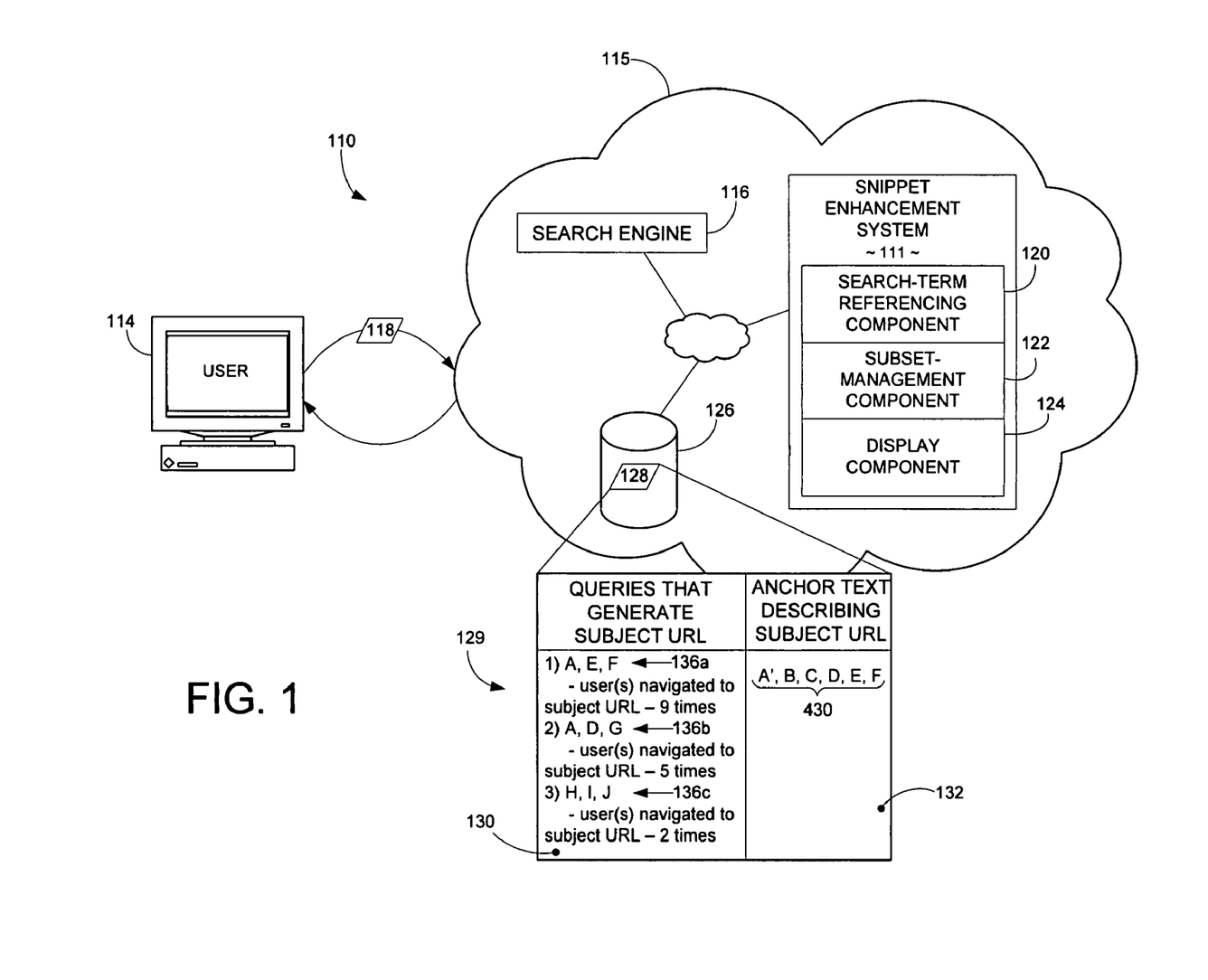
FIG. 1 depicts an illustrative operating environment suitable for practicing an embodiment of our technology.
Figure 2:
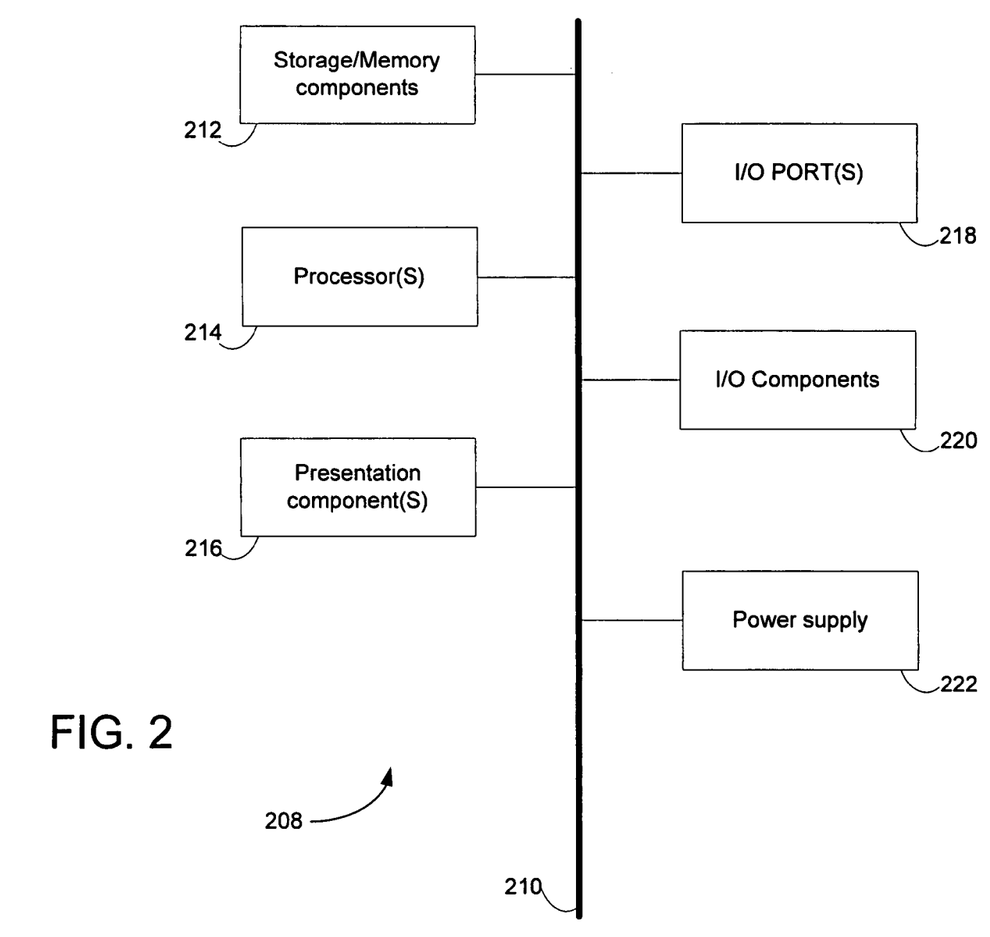
FIG. 2 depicts a block diagram illustrating certain components of an illustrative computing device suitable for practicing an embodiment of our technology.

With initial reference to FIG. 1, an illustrative operating environment suitable for practicing an embodiment of the invention is provided and referenced generally by the numeral 110. Operating environment 110 includes a snippet enhancement system 111, which might include a computing device. A computing device 208 is schematically described in greater detail in connection with FIG. 2, which we will briefly describe to provide a general overview of a computing device 208. In FIG. 2, a diagrammatic block diagram of the computing device is provided, which device might take the form of a conventional computer as well as a consumer electronics device, such as an Internet-connected watch, mobile phone, and the like. Computing device 208 may take on a variety of forms, including, for example, a computing device such as a gaming console, a client computer, a server computer, variations thereof such as laptop computers and palm-top computers, and in some embodiments devices such as PDAs and smart phones. As shown in FIG. 2, a bus 210 couples one or more memory components 212 to one or more processors 214, various presentation components 216, input/output ports 218, input/output components 220, and at least one power supply 222. Other devices including lower-level aspects of the shown devices are not shown so as to not obscure a description of technology.

Memory components 212 include things such as a hard drive, volatile memory (such as RAM), buffers, and the like. The one or more processors 214 control overall data communications throughout computing device 208. Illustrative presentation components 216 include a video card as well as a monitor or other presentation device. Input/output ports 218 provide connectivity to peripheral components such as printers, digital cameras, and the like. Actual input/output components may be things like printers and the like. A power supply 222 provides power to run the computing devices. Not all of the components shown in FIG. 2 need to be present in order to make up a computing device but are shown for illustrative purposes in connection with describing an embodiment of our technology.

Although the various blocks of FIG. 2 are shown with lines for the sake of clarity, in reality, delineating various components is not so clear and, metaphorically, the lines would more accurately be gray and fuzzy. For example, one may consider a presentation component such as a display device to be an I/O component. Also, processors have memory. We recognize that such is the nature of the art and reiterate that the diagram of FIG. 2 is merely illustrative of an exemplary computing device that can be used in connection with one or more embodiments of the present invention.

Embodiments of the present invention may be embodied as, among other things: a method, system, or set of instructions embodied on one or more computer-readable media. Computing device 208 typically includes a variety of computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Returning now to FIG. 1, an exemplary operating environment will now be described in more detail. Generally FIG. 1 includes user computing device 114 in communication with parts of network 115. User computing device 114 might communicate with network 115 for a variety of reasons, such as to communicate search query 118.

Search engine 116 generally includes, or is otherwise in communication with, a variety of components. In exemplary embodiments, search engine 116 is in communication with snippet enhancement system 111. Snippet enhancement system 111 might be an integral component of search engine 116. Alternatively, snippet enhancement system 111 might be a separate component, which is accessible by search engine 116.

Figure 5:
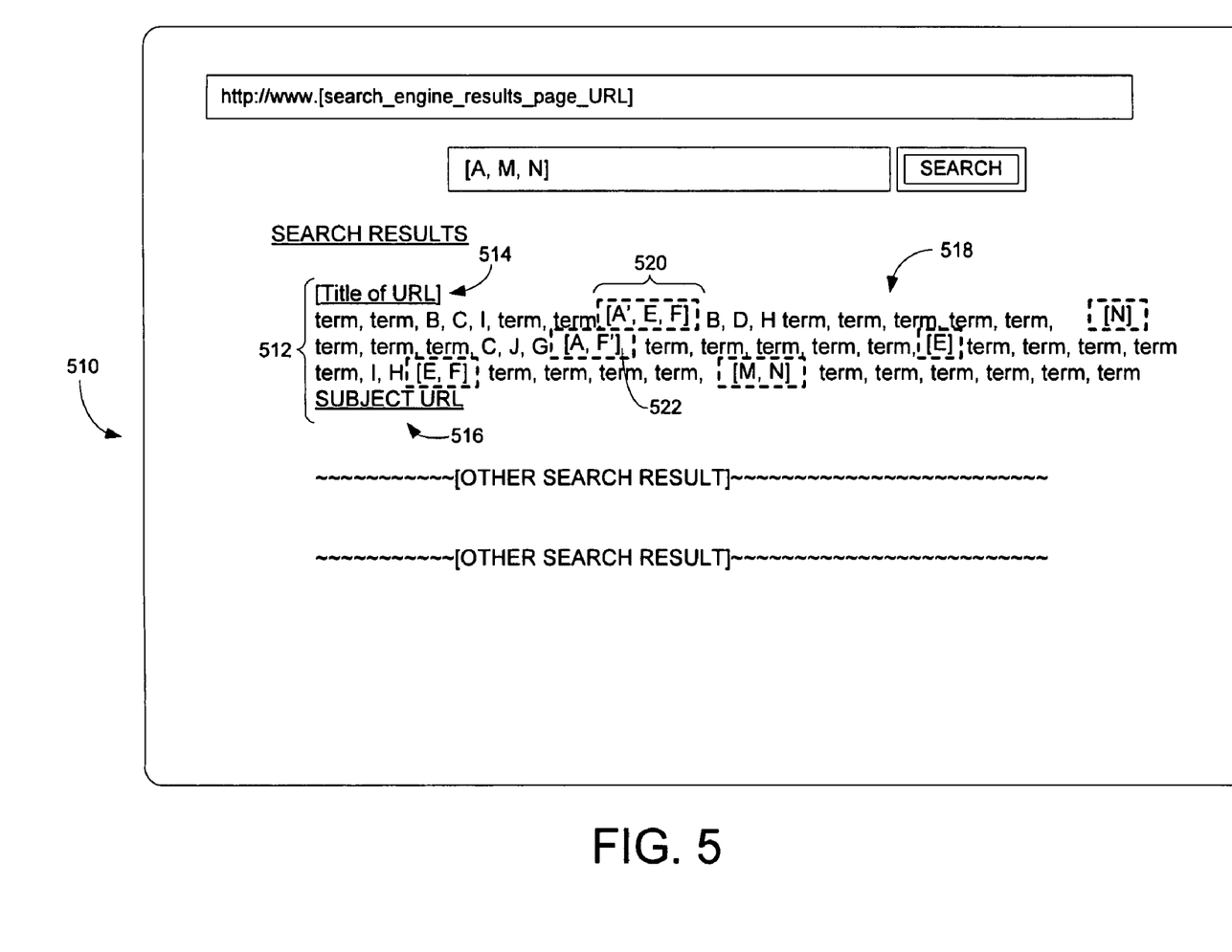
FIG. 5 depicts an exemplary search results page in accordance with an embodiment of the technology.

"Snippet" is used in this description as a shortened version of the term "search-result snippet." In this description a search-result snippet refers to a combination of characters that provide a summary of content associated with a URL. For example, a search-result snippet might include a title for the URL and a body of text related to the URL. The body of text might include various words or phrases that are included on a web page of the URL and that are arranged in the snippet so as to provide a portion of content on the web page. Snippets are often displayed to a user in response to a search query, such that each snippet provides a portion of content of a respective URL. Aspects of our technology include enhancing snippets in order to assist a user in evaluating a snippet and an associated URL. For example, one aspect includes causing terms within a snippet to be visibly distinguished. Referring briefly to FIG. 5, a search result page 510 is depicted, search results page 510 including snippet 512. Snippet 512 includes a title 514 associated with a subject URL 516 and a body of text 518 also associated with subject URL 516. Various portions of body of text 518 are depicted as being visibly distinguished, such as strings 520 and 522.

Figure 3:
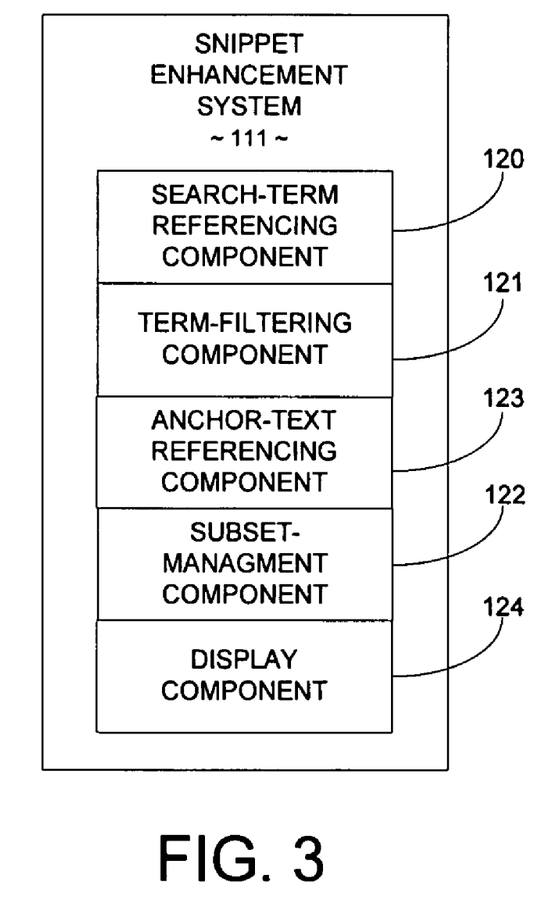
FIG. 3 depicts a block diagram of an exemplary system in accordance with embodiments of the technology.

Snippet enhancement system 111 includes various subcomponents. For example, snippet enhancement system 111 includes search-term referencing component 120, subset-management component 122, and display component 124. Referring briefly to FIG. 3, another illustrative embodiment is shown in which snippet enhancement system 111 includes additional subcomponents. Accordingly, in one aspect of our technology, the snippet enhancement system 111 includes search-term referencing component 120, term-filtering component 121, anchor-text referencing component 123, subset-management component 122, and display component 124.

Returning to FIG. 1, both search engine 116 and snippet enhancement system 111 are in communication with database 126, which includes data 128. For illustrative purposes, an expanded version of data 128 is illustrated by data box 129, which includes various categories of information. Data 128 and data box 129 might be used interchangeably throughout this description; however, it should be understood that reference to either data 128 or data box 129 refers to the same set of data. In one aspect of our technology, data 128 includes a compilation of search terms 130 associated with search queries and a compilation of anchor text 132. Although shown as singular for illustrative purposes, database 126 might include a plurality of databases. As such, search terms 130 and anchor text 132 might be stored in a same database; however, in alternative aspects such data is stored in separate databases.

In exemplary embodiments of the technology, data 128 includes information that is relevant to a subject URL. Throughout this description we refer to a "subject URL" only to assist with explaining our technology. Other than distinguishing a specific URL from other URLs we might refer to herein, the term "subject" is not meant to convey any specific meaning or other limitation. For example, one aspect of our technology relates to enhancing a search result snippet that is associated with a URL, which we might refer to as the "subject URL."

Data 128 relevant to a subject URL might comprise a variety of information. In an exemplary aspect of the technology, data 128 includes a list of historically relevant queries, each historically relevant query including search terms, 136*a*, 136*b*, and 136*c*. In another exemplary aspect of the technology, data 128 includes a compilation of anchor text 132 that describes a subject URL.

Figure 4:
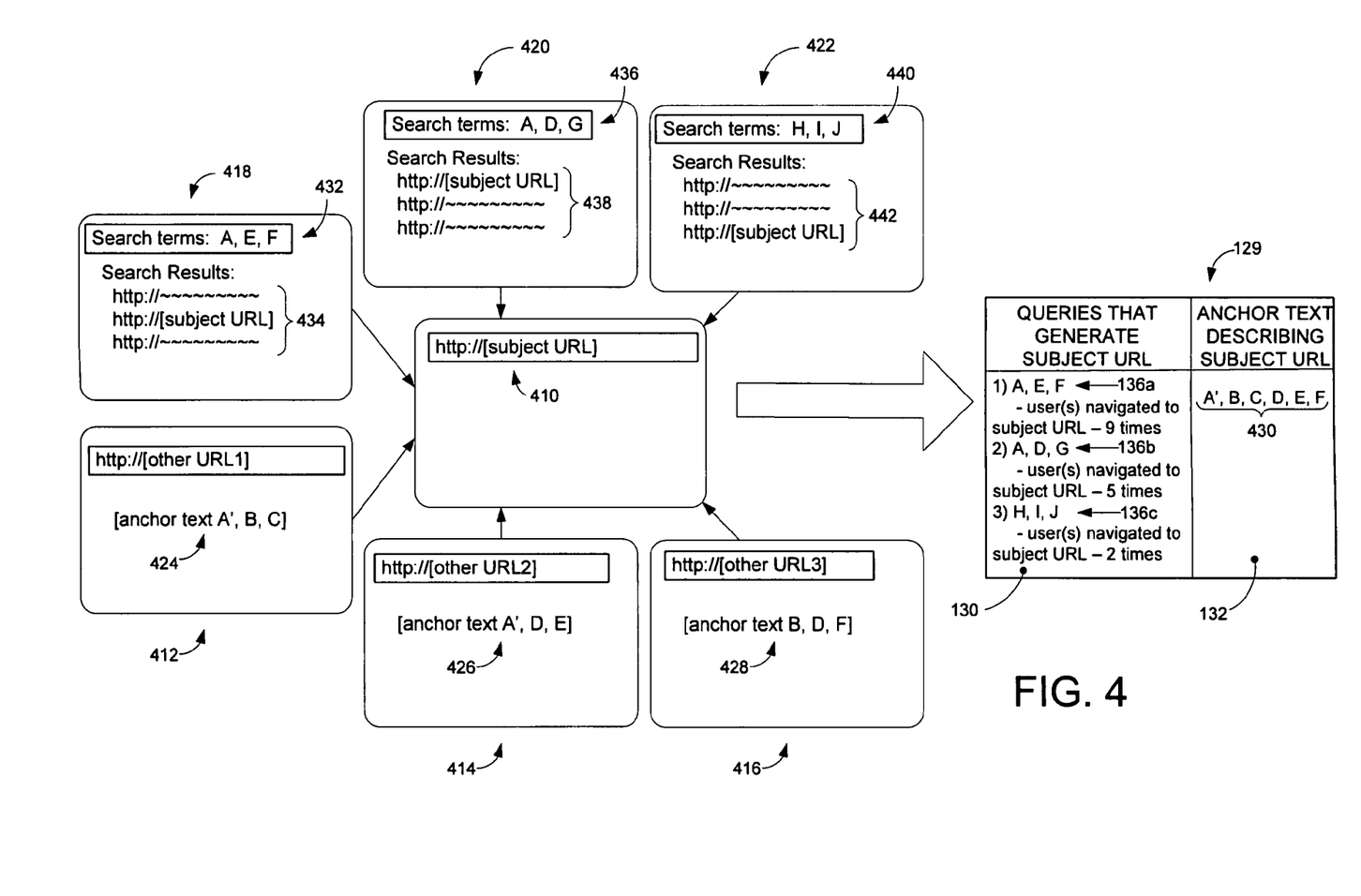
FIG. 4 depicts exemplary relationships of a subject URL to other web pages and illustrates an exemplary organization of data arising from the relationships.

Referring now to FIG. 4, we will describe what is meant by "anchor text" and "historically relevant query." This exemplary description is meant to explain one possible origination for compilations 130 and 132 of data 128. Generally, FIG. 4 depicts various relationships between a subject URL 410 and exemplary web pages 412, 414, and 416 and between subject URL 410 and exemplary search results pages 418, 420, and 422. Such relationships might be depicted by a variety of diagrams, one of which includes a query-URL-click graph.

Web page 412 includes anchor text "[A, B, C]" 424. The term "anchor text" refers to characters and/or words that are in a hyperlink format on a web page and that serve as a link to another URL, e.g., the subject URL 410. Often, anchor text is descriptive of the URL to which the link is provided. For example, where a webmaster inserts the anchor text on his or her web page, the anchor text might be reflective of how the webmaster would describe the URL to which the link is provided. Moreover, one URL might be linked to multiple web pages by a unique set of anchor text on each of the multiple pages. By compiling each of the unique sets of anchor text, a more detailed description of the linked web page can be generated.

For explanatory purposes, letters are used in this description to symbolize individual strings of characters, such as words. For example, each of A, B, and C might represent a respective word. Accordingly, in an exemplary aspect, anchor text [A, B, C] 424 is in a hyperlink format on web page 412 and serves as a link to subject URL 410. Through this link, anchor text [A, B, C] 424 derives a relationship with subject URL 410. In a further aspect, web page 414 includes anchor text [A, D, E] 426, and web page 416 includes anchor text [B, D, F] 428.

In a further embodiment of our technology, for subject URL 410, sets of anchor text, e.g., 424, 426, and 428, are tracked and stored in a database. For example, FIG. 4 depicts data 129, which is previously described with reference to FIG. 1, including compilation of anchor text 132. Compilation of anchor text 132 includes a consolidation of anchor texts 412, 414, and 416. FIG. 4 shows a resulting set 430, including "A, B, C, D, E, F." In an exemplary aspect, resulting set 430 includes terms that are descriptive of subject URL 410 and that are derived from alternative sources, i.e., alternative sets of anchor text.

Subject URL 410 is also shown associated with search results pages 418, 420, and 422. Each of the search results pages 418, 420, and 422 includes a respective search query and respective search results that might be returned in response to the respective search query. For example, search results page 418 includes a search query 432 having search terms [A, E, F]. Moreover, search results page 418 includes a set of search results 434, which are returned in response to search query 432. Search results 434 include a link to subject URL 410 as an individual search result. Likewise, in further exemplary aspects, search results page 420 includes a search query 436 having search terms [A, D, G]. Search results page 420 also includes search results 438, which are returned in response to search query 436 and which include a link to subject URL 410 as an individual search result. Moreover, search results page 422 includes a search query 440 having search terms [H, I, J]. Search results page 422 also includes search results 442, which are returned in response to search query 440 and which include a link to subject URL 410 as an individual search result.

In a further aspect of our technology, each of the search queries 432, 436, and 440 derives a greater degree of relevance with respect to subject URL 410 if a user actually selects a search results link to subject URL 410. For example, when a user enters search query 432 having search terms [A, E, F], search results 434 having a link to subject URL 410 are returned. Subsequently, a user might select the link to subject URL 410, such as by clicking on the link with an input device. As such, search query 432 having search terms [A, E, F] derives relevance to subject URL 410 where search query 432 ultimately directs a user to subject URL 410. With respect to subject URL 410, the term "historically relevant query" describes a search query that returns search results, which include a link to the subject URL and by which a user navigates to the subject URL. As previously indicated, one method in which a user navigates to the subject URL by way of search results includes clicking on the link to the subject URL 410 with an input device, e.g., mouse. For example, search query 432 having search terms [A, E, F] is a historically relevant query because search results 434 include a link to the subject URL and because, as indicated in compilation 130, one or more users have navigated to subject URL 410 by way of the link.

Embodiments of our technology include tracking user navigation to subject URL 410 by way of search results. For example, FIG. 4 shows compilation 130, which lists search queries 432, 436, and 440. Each of search queries 432, 436, and 440 is identified in compilation 130 as 136a, 136b, and 136c (respectively). Compilation 130 also lists with respect to each search query, the number of times that a user has navigated to subject URL 410 by way of each specific search query. For example, one or more users might have entered search query 432 having search terms [A, E, F] into a search engine. Compilation 130 reflects that on 9 occasions some user navigated (e.g., clicked on with mouse) to subject URL 410 by way of search query 432. Further aspects of our technology include sorting search queries in an order according to the number of times a user navigates to subject URL 410 by way of each search query. For example, compilation 130 shows search queries 136a, 136b, and 136c ranked in descending order from a first-ranked search query to a last-ranked search query. As depicted, users navigated to subject URL 410 the highest number of times through first-ranked search query 136a.

As a result of tracking and storing both anchor text describing subject URL 410 and historically relevant queries 410 that are relevant to subject URL 410, in embodiments of our technology compilations 130 and 132 are generated that include terms that describe subject URL 410. For example, data 129 includes compilations 130 and 132 of terms that might be descriptive of subject URL 410. Compilation 130 includes terms A, E, F, D, G, H, I, and J and compilation 132 includes A', B, C, D, E, and F.

Exemplary embodiments of our technology include reconciling multiple sources of potentially descriptive terms, which are associated with a URL, such as by identifying common terms among the multiple sources. In one aspect, to determine potentially descriptive terms of a subject URL, our technology includes reconciling search terms of historically relevant queries and anchor text that describes the URL. For example, one embodiment includes comparing search terms of compilation 130 with terms in anchor text 430, to determine if any of the search terms comprise a subset of anchor text set 430. Reconciling multiple sources of potentially descriptive terms of a subject URL might include various steps and components. In an exemplary embodiment of the technology, search terms are identified from a historically relevant query. For example, referring to FIG. 1, search terms 136a in database 128 are referenced by search-term referencing component 120. In a further aspect, search terms from a historically relevant query are compared to anchor text for the URL to determine if the search terms comprise a subset of the anchor text. For example, subset-management component 122 compares search terms 136a to anchor text 430 to determined whether search terms 136a comprise a subset of anchor text 430.

Further aspects of our technology include reconciling multiple sources of potentially descriptive terms of a subject URL, in the context of enhancing a search result snippet, or preparing to enhance a search result snippet. Enhancing a snippet might be carried out in a variety of ways. In one embodiment of our technology, once common terms of multiple sources are identified, those common terms are caused to be visibly distinguished within the snippet. Examples of visibly distinguishing common terms include emboldening, underlining, highlighting, italicizing, and displaying in a particular section of the snippet, such as in a list under the snippet body of text. FIG. 5 depicts an exemplary snippet 512, in which portions have been visibly distinguished. For example, snippet 512 includes body of text 518 having a string of terms 520 that is visibly distinguished. In aspects of the technology, snippets include a limited number of terms within an associated body of text. For example, snippet 512 includes a limited number of terms within body of text 518. Accordingly, in certain embodiments it is desirable to limit the length of a string of terms that is visibly distinguished, e.g., string 520 includes three terms. Moreover, in embodiments it is desirable to limit the total number of strings of terms that are visibly distinguished within a snippet body of text, e.g., snippet 520 includes six strings that are visibly distinguished. Providing limitations in these respects assists in preventing too many terms in a snippet from being visibly distinguished, as visibly distinguishing too many terms might make it more difficult for a user to quickly evaluate the snippet.

In exemplary embodiments of the technology, parameters are applied in various ways while reconciling multiple sources of potentially descriptive terms for a subject URL. As previously described, a first source of potentially descriptive terms includes search terms of historically relevant queries that are related to the subject URL, e.g., search terms 136a (FIG. 1). One exemplary parameter includes a range of terms-per-string of terms to be visibly distinguished. For example, a range might have an upper limit defined by a terms-per-string maximum and a lower limit of one term. In one aspect of the technology, a set of search terms that are identified from historically relevant queries may not be greater than a terms-per-string maximum in order for that set of search terms to be considered in subsequent steps of reconciliation. For example, if a terms-per-string maximum is set at three terms, search terms 136a would meet the parameter and could then be considered in subsequent steps of reconciliation. However, if the terms-per-string cap was set at two terms, search terms 136a would not meet the parameter, in which case search terms 136a may not be considered.

Aspects of the technology include applying other parameters as well. In one embodiment, it is desirable to exclude certain commonly used terms or phrases from the reconciliation process. Examples of commonly used terms might include: and, a, an, the, to, etc. In an exemplary embodiment, a set of search terms that are identified from historically relevant queries is evaluated to determine whether the set includes any excluded words. If the set does not include any excluded words, the set of search terms may then be considered in subsequent steps in reconciliation. However, if the set of search terms does include excluded words various approaches might be taken. In one aspect, if a set of search terms do include excluded words, no search terms in that set may be used in reconciliation. In this case, an alternative set of search terms might be identified and evaluated. In another aspect, if a set of search terms includes excluded words, the excluded words are excised from the set, and the remaining search terms in the set are used in reconciliation. In a further embodiment, weighting factors might be applied to excluded words. For example, a strong penalty might be applied to some excluded words, which are known to be extremely common and therefore probably not meaningful. For example, a strong penalty might be applied the term "the". Once a strong penalty is applied, the excluded word might not be considered in the reconciliation process. However, for other excluded words, which are common but might be meaningful, a weak penalty might be applied that can be overcome later in the reconciliation process. For example, "information" is a common term, but it might be meaningful depending on the search result snippet. As such, a weak penalty might be applied that can be overcome if "information" is found to have particular relevance to a URL. For example, a weak penalty might be overcome if the term is frequently found within anchor text that describes the URL.

Applying parameters, such as a terms-per-string parameter and an excluded-terms parameter, might be carried out using various components. In an exemplary embodiment, after a search-term referencing component 122 identifies search terms from a historically relevant query, a term-filtering component 121 (FIG. 3) applies parameters against the search terms to determine whether some or all of the identified search terms may be used in subsequent steps of reconciliation.

As previously described, in one aspect of the technology, a determination is made as to whether search terms identified from historically relevant queries, which are related to a subject URL, make up a subset of terms within anchor text for the subject URL. For example, if search terms 136a are identified, one embodiment determines whether a portion of search terms 136a makes up a subset of anchor text 430. An alternative embodiment determines whether all of search terms 136a comprise a subset of anchor text 430. A subset of anchor text 430 might include various configurations of terms within anchor text 430. For example, in one embodiment a subset of terms within anchor text 430 includes each of search terms 136a having a same spelling and a same word order. In alternative embodiments, it is desirable to expand the realm of possible subsets to include non-exact matches of search terms 136a. For example, in some aspects of the technology, subsets include an alternate spelling of search terms 136a; a misspelling; an alternate tense; a synonym; a rearranged word order; words in addition to search terms; and words intervening between search terms 136a. As exemplified in FIG. 1, search terms 136a includes [A] and anchor text 430 includes [A']. Accordingly, in one aspect, [A'] might be a alternate tense of [A], in which case search terms 136a may still be considered a subset of anchor text 430 even though there is not an exact match. Both, embodiments in which a subset must include an exact match of search terms and embodiments in which a subset may include alternate versions of search terms, are contemplated in our technology.

Aspects of the present technology include identifying a target number of distinctive subsets within anchor text. In one embodiment, a distinctive subset is a subset of anchor text that matches an alternative set of search terms. For example, where a first subset is identified matching search terms 136a, aspects of our technology include determining if distinctive subsets exist within the anchor text, the distinctive subsets matching search terms different from search terms 136a. As such, if an exemplary target number of subsets is two, after search terms 136a are determined to comprise a subset of anchor text, a subsequent historically relevant query is referenced to identify search terms, e.g., search terms 136b. In that situation, search terms 136b are compared to anchor text 430 to determine whether search terms 136b match a distinctive subset within anchor text 430. In one embodiment, historically relevant queries are referenced until either a target number of distinctive subsets are identified or all historically relevant queries have been referenced.

Various components might perform functions related to reconciling search terms and anchor text. In an exemplary embodiment, an anchor-text referencing component 123 (FIG. 3) functions to reference anchor text 430 in database 128. In a further embodiment, a subset-management component 122 determines whether search terms make up a subset of anchor text and whether a target number of distinctive subsets have been identified.

As one aspect of our technology relates to enhancing a search result snippet, reconciliation might be performed at alternative times with respect to an enhancement. One embodiment contemplates performing reconciliation at a time remote to displaying a snippet. In these circumstances, once subsets are identified, the subsets are prepared to be retrieved at a later time. For example, the subsets might be stored in a manner so as to be readily available upon determining that a snippet related to a subject URL is to be displayed. In an alternative embodiment, reconciliation is performed "on-the-fly" such as after a search query is received, but before the snippet is displayed in response to the search query.

As previously indicated, in aspects of our technology, subsets are used to enhance search result snippets. One manner of enhancing search result snippets is depicted in FIG. 5, in which strings of terms, e.g., 520, that include subsets have been visibly distinguished within the body of text 518. Aspects of the invention include causing a subset to be visibly distinguished in a snippet, such as when the snippet is displayed to a user in response to a search query. A subset that is visibly distinguished might include various configurations of a subset that was identified within anchor text. In one embodiment, a subset that is visibly distinguished includes an exact match of an anchor-text subset, e.g., exact spelling in same word order. In other embodiments, a subset that is visibly distinguished includes alternative versions of an anchor text subset, such as: an alternate spelling of the anchor-text subset; a misspelling of the anchor-text subset; an alternate tense of the anchor-text subset; a synonym of the anchor-text subset; a rearranged word order; the anchor-text subset with additional words; and the anchor-text subset including intervening words. For example, search terms 136a might comprise a subset of anchor text 430, the subset including [A', E, F]. As such, referring to FIG. 5, versions of [A', E, F] are shown as visibly distinguished. For example, string 520 is an exact match to [A', E, F], whereas string 522 includes one excluded search term and a variation of [F], which is represented as [F'].

In further embodiments various components might function to cause subsets to be visibly distinguished. For example, in one aspect display component 124 (FIG. 3) causes subsets to be visibly distinguished within a search result snippet, such as when the snippet is displayed to a user in response to a search query. Moreover, in certain aspects it is desirable to limit the number of strings of terms within a snippet that may be visibly distinguished. Applying such a string-per-snippet maximum functions to prevent too many terms or strings from being visibly distinguished, which might detract from a users ability to quickly evaluate the snippet. Referring to FIG. 5, a string-per-snippet maximum might have been set at a limit of six, in which case, only six strings of terms are visibly distinguished. Various approaches might be taken to comply with a string-per-snippet maximum. For example, a snippet body of text generally includes a beginning portion and an end portion, in which case, subsets are arranged within the body of text a various positions with respect to the beginning portion and end portion. In one embodiment subsets arranged closest to the beginning portion are automatically visibly distinguished until the strings-per-snippet maximum is reached. Alternatively, subsets to be visibly distinguished might be prioritized according to what order of historically relevant query the subset arises from. For example, subsets arising from search terms 136a might be visibly distinguished first as opposed to subsets arising from search terms 136b.

Figure 6:
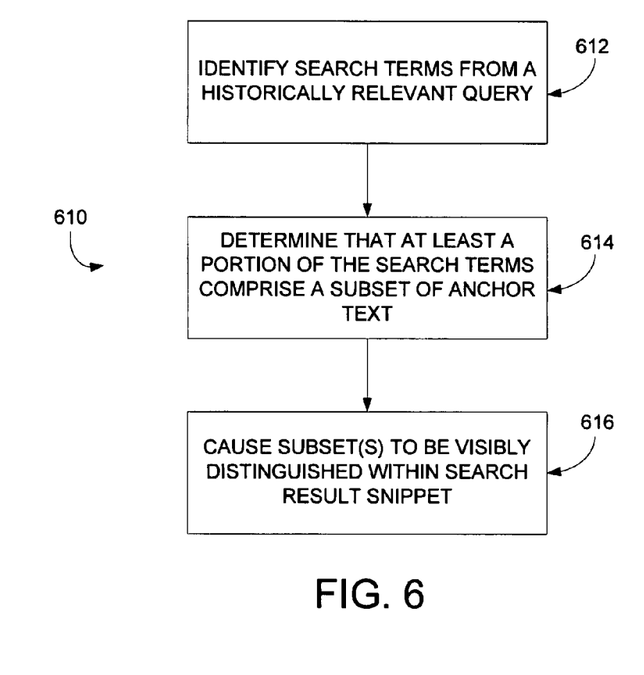
FIGS. 6 and 7 depict flow diagrams illustrating exemplary methods in accordance with an embodiment of the technology.

Referring to FIG. 6, an exemplary method is illustrated and identified generally by numeral 610 for enhancing a search result snippet associated with a URL, which is described by anchor text. Method 610 includes at 612, identifying search terms, e.g., search terms 136a, from a first historically relevant query, which returns as a search result the URL, e.g., subject URL. Element 614 includes determining that at least a portion of the search terms comprise a subset of the anchor text, e.g., anchor text 430, for the URL. Moreover, at step 616, subsets are caused to be visibly distinguished within the search result snippet, such as when the search result snippet is displayed to a user in response to a search query.

Figure 7:
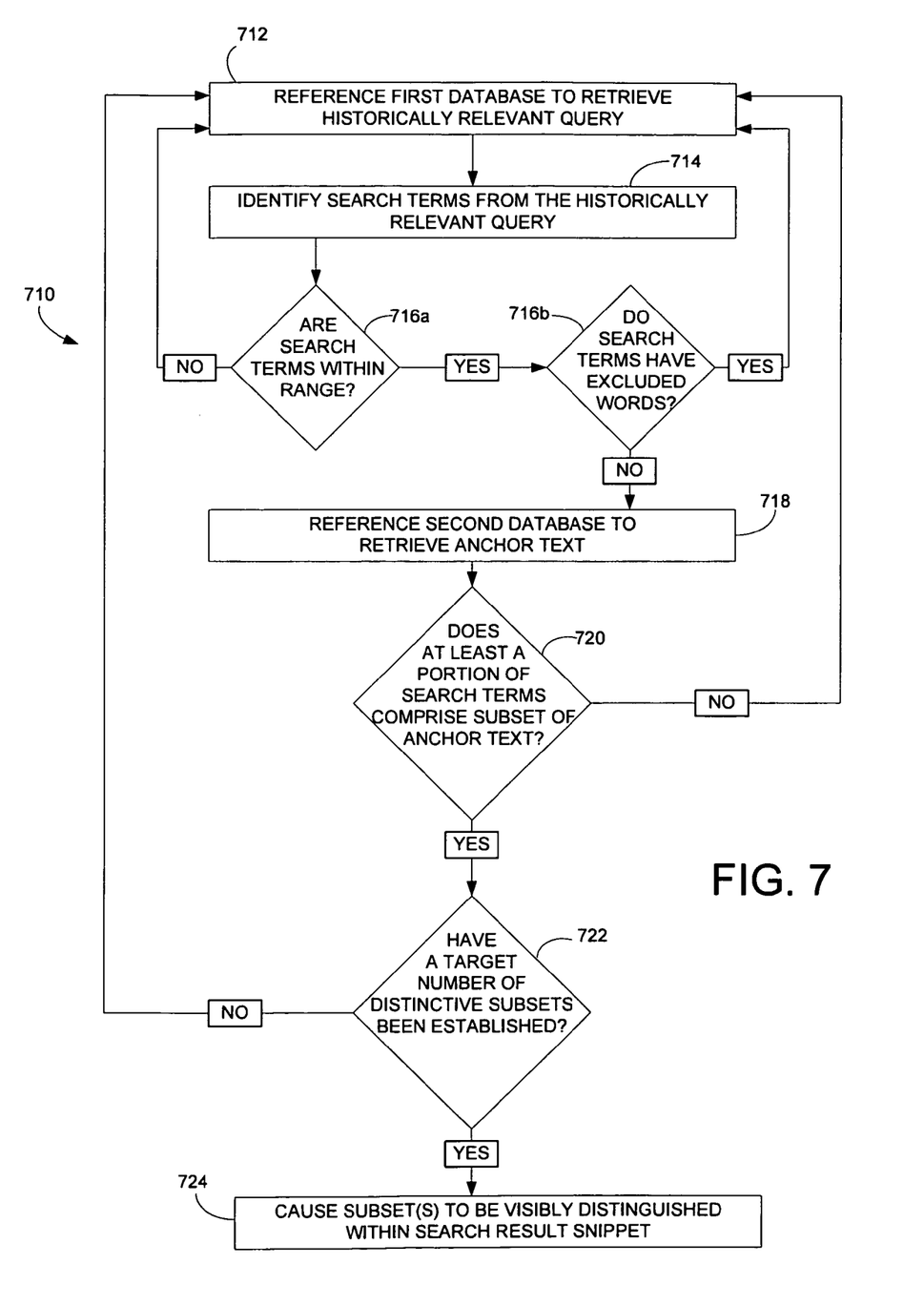

Referring to FIG. 7, another exemplary method for enhancing a search result snippet is illustrated and is identified generally by numeral 710. Method 710 includes at step 712, referencing a first database to retrieve a first historically relevant query that is pertinent to the URL. As previously indicated, in aspects of our technology historically relevant queries are arranged in descending order according to how relevant each query is to the URL, where relevance is measured by the total number of times users navigated to the URL using a query. As such, the more navigation recorded within a time range in the database to the URL for a given query, the greater the relevance of that query to the URL. In aspects of the invention, the first historically relevant query that is retrieved is the most relevant query to the URL, and subsequent retrieval is made by descending order according to how pertinent the query is to the URL. Therefore, more navigation would imply an earlier retrieval of such query (compared to a case of less navigation) in step 712. For example, in one embodiment search-term referencing component 122 of the snippet enhancement system 111 references database 128. At step 714 search terms, e.g., search terms 136a, from a historically relevant query are identified. Steps 716a and 716b include determining whether the search terms both comprise a quantity within a range and do not include excluded words. If one of conditions 716a and 716b is not met the process returns to step 712 to retrieve an alternative historically relevant query. If both conditions are satisfied, at step 718 a second database is referenced to retrieve anchor text for the URL and step 720 includes determining whether at least a portion of the search terms comprises a subset of the anchor text. If at least a portion fails to comprise a subset, the method returns to step 712 to retrieve an alternative historically relevant query. If at least a portion comprises a subset, step 722 includes determining whether a target number of distinctive subsets have been established. If a target number has not been established, the process returns to step 712 to retrieve an alternative historically relevant query. If the target number has been established, step 724 includes causing subsets to be visibly distinguished within the search result snippet.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A non-transitory computer storage media having computer-executable instructions embodied thereon for performing a method of enhancing a search-result snippet that describes a web page, the method comprising:
   retrieving from a database a search term that, when previously submitted to a search engine, resulted in the web page being deemed relevant to the search term by the search engine;
   comparing the search term, which previously resulted in the web page being deemed relevant, to a set of anchor text linked to the web page to determine that at least a portion of the search term comprises a subset of the set of anchor text, wherein the set of anchor text comprises terms that are compiled from at least one other webpage and that are formatted on the at least one other webpage as a hyperlink that, when selected, enables a browser to request the web page; and
   transforming the search result snippet to cause the subset of the set of anchor text to be visibly distinguished within the search result snippet when the search result snippet is displayed in response to a search query.

2. The media of claim 1, wherein the search result snippet comprises one or more of a title of the web page and a body of terms associated with the web page.

3. The media of claim 1,
   wherein the search term is stored in the database together with a set of historically relevant search terms that, when previously input into the search engine, resulted in the web page being deemed relevant by the search engine;
   wherein each historically relevant search term resulted in respective search results being generated by the search engine;
   wherein each of the respective search results included the web page; and
   wherein the web page was selected by a user.

4. The media of claim 3, wherein the search term and the set of historically relevant search terms comprise a descending order from a first-ranked query that resulted in the web page being selected a highest number of times to a last-ranked query that resulted in the web page being selected a least number of times.

5. The media of claim 4, wherein the search term comprises the first-ranked query.

6. The media of claim 1, wherein the search term is included among a plurality of search terms and wherein the method includes determining that the plurality of search terms comprises a quantity within a range.

7. The media of claim 6,
wherein the range includes an upper limit comprising a terms-per-string maximum; and
wherein the terms-per-string maximum comprises a limit on a quantity of terms that can be visibly distinguished in a continuous string of terms in the search result snippet.

8. The media of claim 1, wherein the search term is included among a plurality of search terms and wherein the method includes determining that the plurality of search terms does not comprise one or more excluded words.

9. The media of claim 1, wherein the at least a portion of the search term comprises the subset of the set of anchor text when terms included in the anchor text comprise one or more of:
- an exact match of the at least a portion;
- an alternate spelling of the at least a portion;
- a misspelling of the at least a portion;
- an alternate tense of the at least a portion;
- a synonym of the at least a portion;
- the at least a portion in a rearranged order;
- the at least a portion including additional words; and
- the at least a portion including intervening words.

10. The media of claim 1, wherein the subset to be visibly distinguished comprises one or more of:
- an exact match of the subset of the anchor text;
- an alternate spelling of the subset of the anchor text;
- a misspelling of the subset of the anchor text;
- an alternate tense of the subset of the anchor text;
- a synonym of the subset of the anchor text;
- the subset of the anchor text in a rearranged order;
- the subset of the anchor text including additional words; and the subset of the anchor text including intervening words.

11. A system, which includes a processor operatively coupled with a non-transitory computer storage media, for carrying out a method of enhancing a search result snippet that describes a web page, the system comprising:
- a search-term referencing component that retrieves from a datastore a search term of a query that, when previously submitted to a search engine, resulted in the web page being deemed relevant by the search engine;
- a comparison component that leverages the processor to compare the search term of the query to anchor text linked to the web page to determine that at least a portion of the search term of the query comprises a subset of the anchor text, wherein the anchor text comprises terms that are compiled from at least one other webpage and that are formatted on the at least one other webpage as a hyperlink that, when selected, enables a browser to request the web page; and
- a display component for transforming the search result snippet to cause the subset of the set of anchor text to be visibly distinguished within the search result snippet when the search result snippet is displayed.

12. The system of claim 11, further comprising a term-filtering component, wherein, when the search term is included in a set of search terms, the term-filtering component determines:
- whether the set of search terms includes a quantity within a range; and
- whether the set of search terms includes an excluded word.

13. The system of claim 11, further comprising an anchor-text referencing component for referencing the anchor text.

14. The system of claim 13, wherein the search term and the anchor text are referenced in one or more databases and wherein the one or more databases store the anchor text and the historically relevant query in a query-URL-click graph.

15. The system of claim 11, wherein the one or more subsets to be visibly distinguished are subject to a strings-per-snippet maximum.

16. A method of enhancing a search result snippet that describes a web page, the method comprising:
- retrieving from a first database a first historically relevant query that, when previously submitted to a search engine resulted in the web page being deemed relevant by the search engine, wherein the first database comprises a set of relevant queries compiled by tracking navigation to the web page by way of various search-results pages;
- identifying a set of search terms from the first historically relevant query;
- determining that the set of search terms:
  (1) comprises a quantity of search terms that is within a range; and
  (2) does not include excluded words;
- retrieving from a second database anchor text that links to the web page, wherein the anchor text comprises terms that are compiled from at least one other webpage and that are formatted on the at least one other webpage as a hyperlink that, when selected, enables a browser to request the web page;
- determining that a portion of the set of the search terms comprises a subset of the anchor text; and
- transforming the search result snippet to cause the subset of the set of anchor text to be visibly distinguished within the search result snippet when the search result snippet is displayed.

17. The method of claim 16, wherein if the set of search terms either (1) comprise either a quantity outside the range or excluded words, or (2) do not comprise a subset of the anchor text, the method further comprises:
- referencing the first database to retrieve a second historically relevant query of the web page;
- identifying search terms from the second historically relevant query;
- determining that the search terms of the second historically relevant query:
  (1) comprise a quantity within a range, and
  (2) do not include excluded words;
- determining that at least a portion of the search terms of the second historically relevant query comprises a subset of the anchor text; and
- causing one or more subsets to be visibly distinguished within the search result snippet when the search result snippet is displayed to a user in response to a search query.

18. The method of claim 16, wherein the first database is referenced incident to performance of a search that generates the search result snippet as a result.

19. The method of claim 16, wherein the method further comprises, after determining that at least a portion of the search terms comprises a subset of the anchor text, preparing the subset to be visibly distinguished.

20. The method of claim 19, wherein the method further comprises, incident to a search being performed in which the search result snippet is generated, referencing the subset prior to causing the one or more subsets to be visibly distinguished.

* * * * *